(12) United States Patent
Haubach

(10) Patent No.: US 7,335,041 B2
(45) Date of Patent: Feb. 26, 2008

(54) BUS BAR SUPPORT

(75) Inventor: Ulrich Haubach, Greifenstein (DE)

(73) Assignee: Rittal GmbH & Co. KG, Herborn (DE)

( * ) Notice: Subject to any disclaimer, the term of this patent is extended or adjusted under 35 U.S.C. 154(b) by 73 days.

(21) Appl. No.: 10/576,379

(22) PCT Filed: Jun. 18, 2005

(86) PCT No.: PCT/EP2005/006594

§ 371 (c)(1),
(2), (4) Date: Apr. 19, 2006

(87) PCT Pub. No.: WO2006/007913

PCT Pub. Date: Jan. 26, 2006

(65) Prior Publication Data

US 2007/0072458 A1     Mar. 29, 2007

(30) Foreign Application Priority Data

Jul. 19, 2004   (DE)  ...................... 10 2004 034 898

(51) Int. Cl.
*H01R 4/60* (2006.01)

(52) U.S. Cl. .................. 439/212; 174/70 B; 174/68.2; 361/611

(58) Field of Classification Search ................ 439/212, 439/76.2, 213, 110–119; 174/70 B, 68.2, 174/72 B, 99 B; 361/611
See application file for complete search history.

(56) References Cited

U.S. PATENT DOCUMENTS

| | | | | |
|---|---|---|---|---|
| 3,044,036 A | * | 7/1962 | Herrmann | 439/114 |
| 3,113,820 A | * | 12/1963 | Norden | 439/114 |
| 4,242,718 A | * | 12/1980 | Shariff et al. | 361/611 |
| 4,255,838 A | * | 3/1981 | Obst et al. | 191/22 R |
| 4,781,608 A | * | 11/1988 | Hillmann | 439/212 |
| 4,916,574 A | * | 4/1990 | Hancock et al. | 361/649 |
| 5,008,493 A | * | 4/1991 | Wagener | 174/68.2 |

(Continued)

FOREIGN PATENT DOCUMENTS

DE    103 00 723 A1    7/2004

*Primary Examiner*—Gary F. Paumen
(74) *Attorney, Agent, or Firm*—Pauley Petersen & Erickson

(57) ABSTRACT

A bus bar support, including a lower part which can be mounted with a lower side thereof to the base. Several bus bars which are disposed in a longitudinal direction and at a distance from each other, are used to insert, in an isolated manner, bush bars extending in a transversal direction and are arranged in an upper side of the lower side. The bush bar support also includes a removable upper part which blocks and closes the bus bars. One object of this invention is to provide bus bars in a simple manner, which are easy to handle and which can adapt in many ways to the bus bars which have various cross sections. As a result, the bus bar support includes separate sliding elements which are used to define the bus bar receiving elements in a direction of thickness extending from the lower side to the upper side. Bearing inserts are used to define the bus bar receiving elements in a direction of width extending in a transverse manner on the longitudinal extension of the inserted bus bars. Also the bus bar support includes, in the areas surrounding the bus bar receiving elements, guiding structures wherein the sliding elements and the bearing insert are arranged in an adjustable manner.

16 Claims, 1 Drawing Sheet

U.S. PATENT DOCUMENTS

| | | | |
|---|---|---|---|
| 5,213,518 A * | 5/1993 | Weidler | 439/211 |
| 5,259,774 A * | 11/1993 | Gabrius | 439/110 |
| 5,329,424 A * | 7/1994 | Patel | 361/775 |
| 5,847,321 A * | 12/1998 | Carle et al. | 174/99 B |
| 6,549,428 B1 * | 4/2003 | Fontana et al. | 361/825 |
| 6,664,478 B2 * | 12/2003 | Mohan et al. | 174/149 B |
| 6,672,889 B2 * | 1/2004 | Biermeier et al. | 439/212 |
| 2001/0028547 A1 * | 10/2001 | Wagener | 361/611 |
| 2003/0096515 A1 | 5/2003 | Biermeier et al. | |
| 2006/0035517 A1 | 2/2006 | Wagener | |

* cited by examiner

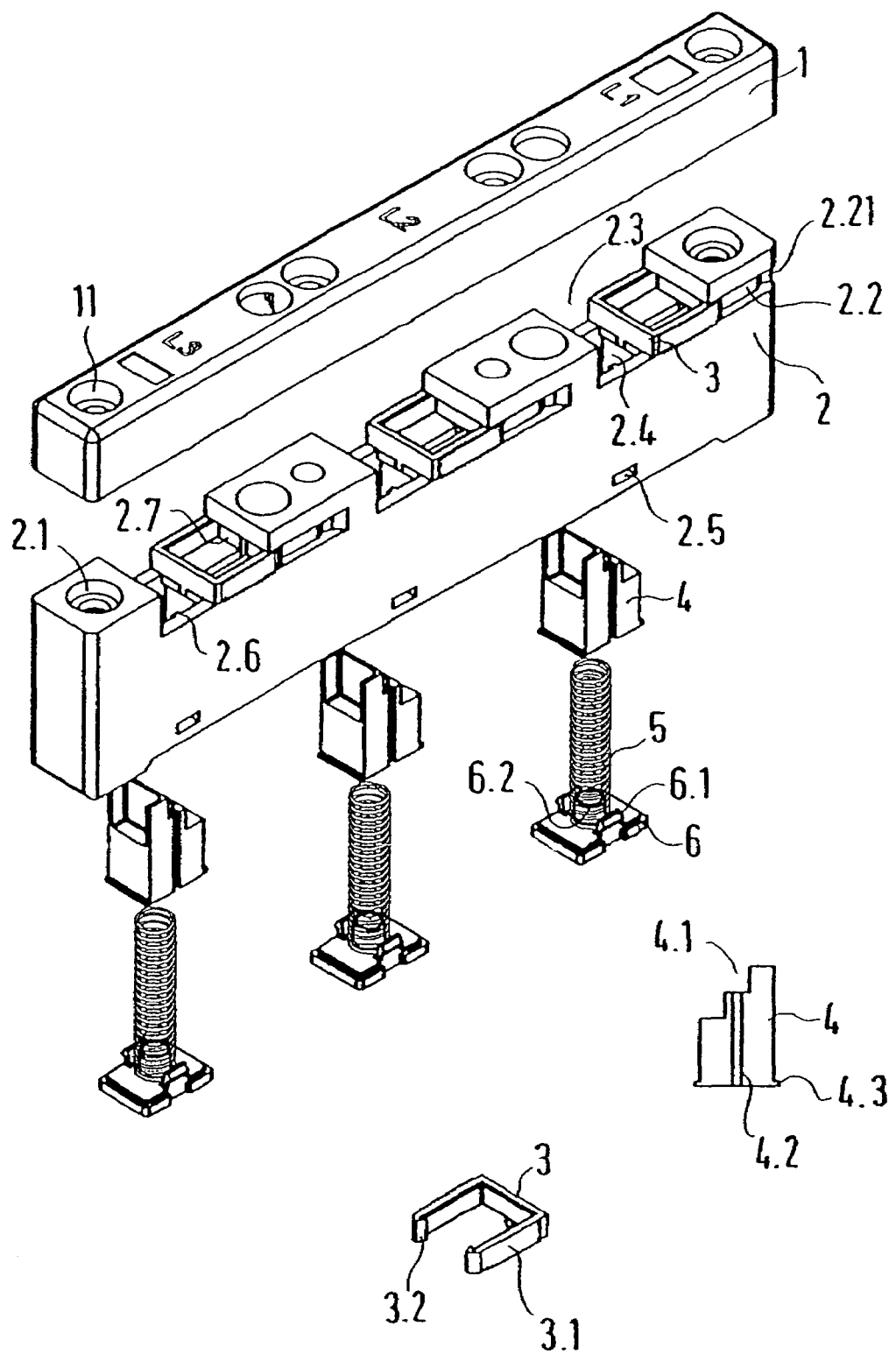

BUS BAR SUPPORT

BACKGROUND OF THE INVENTION

1. Field of the Invention

This invention relates to a bus bar support, having a lower element, which can be mounted with its underside on a base, a top into which several bus bar receptacles are cut and spaced apart from each other in the longitudinal direction and are designed for the insulated insertion of bus bars extending in a transverse direction, and a removable upper element, which closes the receptacles and fixes the inserted bus bars in place.

2. Discussion of Related Art

A bus bar support is taught by German Patent Reference DE 103 00 723 A1, and the bus bar support is of a bus bar system. Several bus bars are inserted in a customary manner into rectangular, open at the top, receptacles on a lower element, with a longitudinal direction that is oriented transversely with respect to the bus bars, and are fixed in place therein by an upper element screwed to it. The underside of the lower element is mounted on a base. If it is necessary to fix bus bars of different width or thickness in this way, bus bar supports with appropriately matched bus bar receptacles are used.

SUMMARY OF THE INVENTION

One object of this invention is to provide a bus bar support of the type mentioned above but in which bus bars of different width and thickness can be solidly fixed in place.

This object is attained with a bus bar support having the characteristics described in this specification and in the claims. There are separate sliding elements for blocking the bus bar receptacles in a direction of their thickness extending from the bottom to the top, and bearing inserts for blocking the bus bar receptacles in a direction extending transversely to the longitudinal extension of inserted bus bars and in the longitudinal direction of the lower element. In its areas surrounding the bus bar receptacles, the bus bar support has guide structures, in which the sliding elements and the bearing inserts are displaceably seated.

Variable matching of the bus bar receptacle to bus bars of different width and/or thickness is possible with the sliding elements and bearing inserts seated in this way, while providing solid fixation in place. It is also possible to insert into the bus bar receptacles of the bus bar support, for example, bus bars which are of different width or thickness from one bus bar receptacle to the other bus bar receptacle of the same support.

Simple handling and adaptation to common bus bar cross sections are achieved if the bus bar receptacles have a rectangular shape in longitudinal section of the lower element and are open toward the top. In their blocking position, the sliding elements rest on the underside of the bus bar receptacle and in their blocking position the bearing inserts rest against a lateral face of the bus bar receptacle.

In a simple embodiment which provides simple manipulation when matching the thickness, the sliding elements are designed to be U-shaped and the guide structures for the sliding elements are embodied as guide grooves, which extend from a lateral surface of the bus bar receptacle parallel with the base of the bus bar receptacle and in which the lateral legs are guided. In the pushed-out position, the bottom of the U rests with its underside on the base of the bus bar receptacle.

Definite positions of the sliding element are obtained with resiliently designed lateral legs having on their inside snap-in elements, and at least one snap-in counter element, which is matched to them, is embodied in the guide grooves and arranged so that, in the completely inserted position of the sliding element and/or in the pulled-out position of the sliding element, the lateral legs are resiliently snapped in place. On the guide face of the bus bar receptacles adjoining the guide grooves, a transversely extending cutout which is matched to the bottom of the U is cut, into which the bottom of the U completely enters in the completely pushed-in state of the sliding element, so that the entire depth of the bus bar receptacle is usable. These measures also contribute to the captive seating of the sliding elements on the lower element. If required, the sliding elements can be completely removed over a detent in the groove by the exertion of additional force. Thus, in the completely pushed-in state of the sliding elements the sliding element receiver is available over its entire thickness.

A simple adaptation to different bus bar widths, along with a simple manipulation, is achieved by the steps wherein insert guides are formed below the bus bar receptacles between lateral outside wall areas of the lower element, in which bearing inserts are seated, displaceable to a limited extent in the direction of the normal line with respect to the bottom of the bus bar receptacle. In the completely lowered state, the bearing inserts reach with their tops at most as far as the bottom of the bus bar receptacle, and in their blocking position rest with their backs on the lateral surface of the bus bar receptacle located opposite the sliding element. The clear width of the bus bar receptacles is limited by a front of the bearing insert which is definitely distanced parallel from this lateral surface.

If the fronts of the bearing inserts are stepped, so that several front sections are formed, which definitely limit the bus bar receptacles in the broad direction as a function of the number of steps, such as the number of front sections formed by them, then there are a corresponding multitude of adaptations to different bus bars widths. In this way, a match to a multitude of bus bars with different cross sections in the thickness and width directions results in combination with the separate sliding element.

Handling is simplified if the bearing inserts are supported by a spring arrangement in the respective insert guides, and in the position of rest are pushed out into the bus bar receptacle as far as their push-in limit. While inserting the bus bars, the bearing inserts are pushed in against the spring force if required, in order to insert a wider bus bar.

In one embodiment which is advantageous for the structure and the way of functioning, the spring arrangement has a compression spring, which is supported on a support element which is releasably inserted in the area of the underside of the lower element. Also, those measures are advantageous for the production and the structure of the bus bar support, wherein on two oppositely located outer edges the support element has fixation sections which are snapped into matched fixation elements on the outside wall areas of the lower element.

BRIEF DESCRIPTION OF THE DRAWING

This invention is explained in greater detail in view of an exemplary embodiment, making reference to the drawing, wherein the figure shows an exploded perspective view of a bus bar support with a lower element, according to one embodiment of this invention.

DESCRIPTION OF PREFERRED EMBODIMENTS

The figure shows a bus bar support with a lower element 2, which can be mounted with its underside on a base and in whose top, which faces away from the underside, several, in this case three, bus bar receptacles 2.3 are formed, in which bus bars, in particular of rectangular cross section, can be received and fixed in place by an upper element 1 to be screwed on or snapped on and fixed. For screwing, the upper element 1 has screw holes 1.1, which correspond to screw receivers 2.1 in the lower element 2.

The bus bar receptacles 2.3 can be varied in their thickness or depth and their width extending in the longitudinal direction of the lower element 2 by inserted sliding elements 3 in order to provide an adaptation to bus bars of different width and/or thickness. For inserting the sliding element 3, guide grooves 2.2, which are U-shaped in cross section, are cut parallel with the underside of the bus bar receptacle 2.3 on both outer sides of the lower element 2 into a lateral wall which delimits the bus bar receptacle 2.3 in the direction of its width, and whose underside can extend flush with the underside of the bus bar receptacle 2.3, and whose width is matched to the thickness of the sliding elements 3 extending in the direction of the depth of the bus bar receptacle 2.3. The lateral legs 3.1 of the U-shaped sliding elements 3 are displaceably guided in the guide grooves 2.2. In the end area located toward the bus bar receptacle 2.3 of the groove bottom of the guide grooves 2.2 and in their end area facing away from the bus bar receptacle 2.3, holding elements 2.21 in the form of recesses are formed, into which snap-in protrusions 3.2 formed on the end areas of the insides of the lateral legs snap in by the spring effect of the lateral legs 3.1 when the respective sliding element 3 is completely pushed in, or is brought into the pulled-out position. Also, in the completely pushed-in position, the bottom of the U of the sliding element 3 rests completely in a recess 2.7 formed in the assigned lateral face of the bus bar receptacle 2.3 between the two respective guide grooves 2.2, so that the entire depth of the bus bar receptacle 2.3 is available without limitation. In the pulled-out state of the sliding elements 3 these rest with an underside of their lateral legs 2.1 and its bottom of the U on the underside of the bus bar receptacle 2.3, so that the bus bar receptacle 2.3 is accordingly limited in its depth and an inserted bus bar is solidly supported on the lower element 2. On their exterior, the lateral legs 3.1 have a non-skid structure, so that they can be easily adjusted. It is also advantageous if the sliding elements 3 are captively held in the guide grooves 2.2 of the lower element 2.

For varying the width of the bus bar receptacles 2.3, displaceable bearing inserts 4 are provided in the direction of thickness of the bus bar, or the direction of depth of the bus bar receptacle 2.3, which are displaceably seated in an insert guide 2.4 arranged between outside wall areas of the lower element 2. In their state in which they are pushed out toward the top, in which they delimit the respective bus bar receptacle 2.3 in the direction of width by their front side facing the receptacle, the bearing inserts 4 rest with their backs against the respective lateral face of the bus bar receptacle 2.3 which faces away from the sliding element 3, so that a solid support in the direction of width results. On their front facing the clear space of the bus bar receptacle 2.3, the bearing inserts have front sections formed by steps 4.1, which extend parallel with respect to the lateral surface of the bus bar receptacle 2.3. Thus, depending on the push-out distance of the bearing inserts 4 from the insert guide 2.4, different widths of the bus bar receptacle 2.3 are achieved, so that differently wide bus bars can be solidly fixed in place accordingly.

Toward the bottom, the bearing inserts 4 are supported by respective compression springs 5 on a support element 6, which is fixed in place in the area of the underside of the lower element 2. The plate-shaped support element 6 has a holding peg 6.2, which is formed on its top and matched to the cylindrical spring 5 for inserting the spring 5. With its other end, the spring 5 is definitely maintained in the area of the underside, or inside, of the bearing insert 4 at a matched holding element. So that the bearing insert 4 is definitely guided in the direction of the thickness of the bus bar, guide grooves which extend in the thickness direction are cut on both sides of it, which are engaged by guide elements 2.6 in the form of guide strips formed on the inside of the outside wall sections. In the completely pushed-in position, the bearing insert 4 protrudes with its top at most as far as the level of the underside of the bus bar receptacle 2.3. The pushed-out position of the bearing insert 4 is delimited by a blocking element 4.3, which works together with a blocking element attached at a corresponding location of the lower element 2.

With fixation sections 6.1 in the shape of snap-in pegs and snap-in protrusions attached on the inside in the lower area of the outside wall sections to both sides of the support element 6, the support element 6 is solidly and releasably snapped into fixation elements 2.5 in the shape of snap-in recesses applied to the appropriate locations and for supporting the spring 5.

The sliding element 3 and the bearing inserts 4, which can be adjusted separately, simply permit the matching of the bus bar receptacle 2.3 to bus bars of different thickness and different width, wherein the adjustment elements in the form of the sliding elements and bearing inserts 4 are captively held in the lower element 2. For inserting a bus bar, first the sliding element 3 is placed into the pushed-in or pulled-out position corresponding to the thickness of the bus bar, then the underside of the bus bar is introduced into the bus bar receptacle 2.3, wherein the one narrow longitudinal side is placed against the lateral surface of the bus bar receptacle facing the sliding element 3, so that the other narrow longitudinal side automatically finds the appropriate front section of the bearing insert 4 for blocking, and the bearing insert 4, if required, is then inserted accordingly far into the insert guide 2.4 against the spring force.

It is advantageous to match the bus bar receptacle 2.3, the slider 3 and the bearing inserts 4 in accordance with common cross-sectional dimensions of bus bars, for example 15×5 to 30×10 mm, in steps of 5 mm in thickness and width. In this case bus bars with cross sections which differ from each other can then also be inserted into the different bus bar receptacles 2.3.

The invention claimed is:

1. A bus bar support, having a lower element (2) which can be mounted with an underside thereof on a base, and a top into which several bus bar receptacles (2.3) are cut, which are spaced apart from each other in a longitudinal direction and are designed for the insulated insertion of bus bars extending in a transverse direction, and a removable upper element (1), which closes the receptacles and fixes in place the inserted bus bars, the bus bar support comprising:

separate sliding elements (3) for blocking the bus bar receptacles (2.3) in a thickness direction extending from a bottom to a top, and bearing inserts (4) for blocking the bus bar receptacles (2.3) in a direction extending transversely to a longitudinal extension of inserted bus bars, and surrounding the bus bar receptacles (2.3) the bus bar support has guide structures (2.2, 2.4) in which the sliding elements (3) and the bearing inserts (4) are displaceably seated.

2. The bus bar support in accordance with claim 1, wherein the bus bar receptacles (2.3) have a rectangular shape in a longitudinal section of the lower element (2) and are open toward the top, in a blocking position each of the sliding elements (3) rests on the underside of the bus bar receptacle (2.3), and in the blocking position each of the bearing inserts (4) rests against a lateral face of the bus bar receptacle (2.3).

3. The bus bar support in accordance with claim 2, wherein the sliding elements (3) are U-shaped and the guide structures for the sliding elements (3) are guide grooves (2.2) which extend from a lateral surface of the bus bar receptacle (2.3) parallel with a base of the bus bar receptacle (2.3) in which lateral legs (3.1) are guided, and in a pushed-out position a bottom of the U-shape rests with an underside on the base of the bus bar receptacle (2.3).

4. The bus bar support in accordance with claim 3, wherein the lateral legs (3.1) are resilient and have on an inside a snap-in element (3.2), and at least one matched snap-in counter element (2.21) embodied in the guide grooves (2.2) and arranged so that in at least one of a completely inserted position of the sliding element (3) and a pulled-out position of the sliding element (3), the lateral legs (3.1) are resiliently snapped in, and on a guide face of the bus bar receptacles (2.3) adjoining the guide grooves (2.2) a transversely extending cutout (2.7) is matched to the bottom of the U-shape, into which the bottom of the U-shaped sliding element (3) completely enters in the completely pushed-in state of the sliding element (3), so that an entire depth of the bus bar receptacle (2.3) is usable.

5. The bus bar support in accordance with claim 4, wherein insert guides (2.4) are formed below the bus bar receptacles (2.3) between lateral outside wall areas of the lower element (2), in which bearing inserts (4) are seated and displaceable to a limited extent in a direction of a normal line with respect to the bottom of the bus bar receptacle (2.3) wherein, in a lowered state the bearing inserts (4) reach with their tops as far as the bottom of the bus bar receptacle (2.3), and in the blocking position rest with their backs on a lateral surface of the bus bar receptacle (2.3) located opposite the sliding element (4), and a clear width of the bus bar receptacles (2.3) is limited by a front which is distanced parallel from the lateral surface.

6. The bus bar support in accordance with claim 5, wherein fronts of the bearing inserts (4) are stepped to form several front sections which definitely limit the bus bar receptacles (2.3) in a broad direction.

7. The bus bar support in accordance with claim 6, wherein the bearing inserts (4) are supported by a spring arrangement in the respective insert guides (2.4) and in a rest position are pushed out into the bus bar receptacle (2.3) as far as a push-in limit.

8. The bus bar support in accordance with claim 7, wherein the spring arrangement has a compression spring (5) supported on a support element (6) which is releasably inserted near the underside of the lower element (2).

9. The bus bar support in accordance with claim 8, wherein on two oppositely located outer edges the support element (6) has fixation sections (6.1) snapped into matched fixation elements (2.5) on the outside wall areas of the lower element (2).

10. The bus bar support in accordance with claim 1, wherein the sliding elements (3) are U-shaped and the guide structures for the sliding elements (3) are guide grooves (2.2) which extend from a lateral surface of the bus bar receptacle (2.3) parallel with a base of the bus bar receptacle (2.3) in which lateral legs (3.1) are guided, and in a pushed-out position a bottom of the U-shape rests with an underside on the base of the bus bar receptacle (2.3).

11. The bus bar support in accordance with claim 10, wherein the lateral legs (3.1) are resilient and have on an inside a snap-in element (3.2), and at least one matched snap-in counter in the guide grooves (2.2) and arranged so that in at least one of a completely inserted position of the sliding element (3) and a pulled-out position of the sliding element (3), the lateral legs (3.1) are resiliently snapped in, and on a guide face of the bus bar receptacles (2.3) adjoining the guide grooves (2.2) a transversely extending cutout (2.7) is matched to the bottom of the U-shape, into which the bottom of the U-shaped sliding element (3) completely enters in the completely pushed-in state of the sliding element (3), so that an entire depth of the bus bar receptacle (2.3) is usable.

12. The bus bar support in accordance with claim 1, wherein insert guides (2.4) are formed below the bus bar receptacles (2.3) between lateral outside wall areas of the lower element (2), in which bearing inserts (4) are seated and displaceable to a limited extent in a direction of a normal line with respect to the bottom of the bus bar receptacle (2.3) wherein, in a lowered state the bearing inserts (4) reach with their tops as far as the bottom of the bus bar receptacle (2.3), and in the blocking position rest with their backs on a lateral surface of the bus bar receptacle (2.3) located opposite the sliding element (4), and a clear width of the bus bar receptacles (2.3) is limited by a front which is distanced parallel from the lateral surface.

13. The bus bar support in accordance with claim 12, wherein fronts of the bearing inserts (4) are stepped to form several front sections which definitely limit the bus bar receptacles (2.3) in a broad direction.

14. The bus bar support in accordance with claim 1, wherein the bearing inserts (4) are supported by a spring arrangement in the respective insert guides (2.4) and in a rest position are pushed out into the bus bar receptacle (2.3) as far as a push-in limit.

15. The bus bar support in accordance with claim 14, wherein the spring arrangement has a compression spring (5) supported on a support element (6) which is releasably inserted near the underside of the lower element (2).

16. The bus bar support in accordance with claim 15, wherein on two oppositely located outer edges the support element (6) has fixation sections (6.1) snapped into matched fixation elements (2.5) on the outside wall areas of the lower element (2).

* * * * *